Sept. 22, 1953 L. J. HIBBARD 2,653,286
PULSATING-CURRENT MOTOR
Filed May 5, 1951
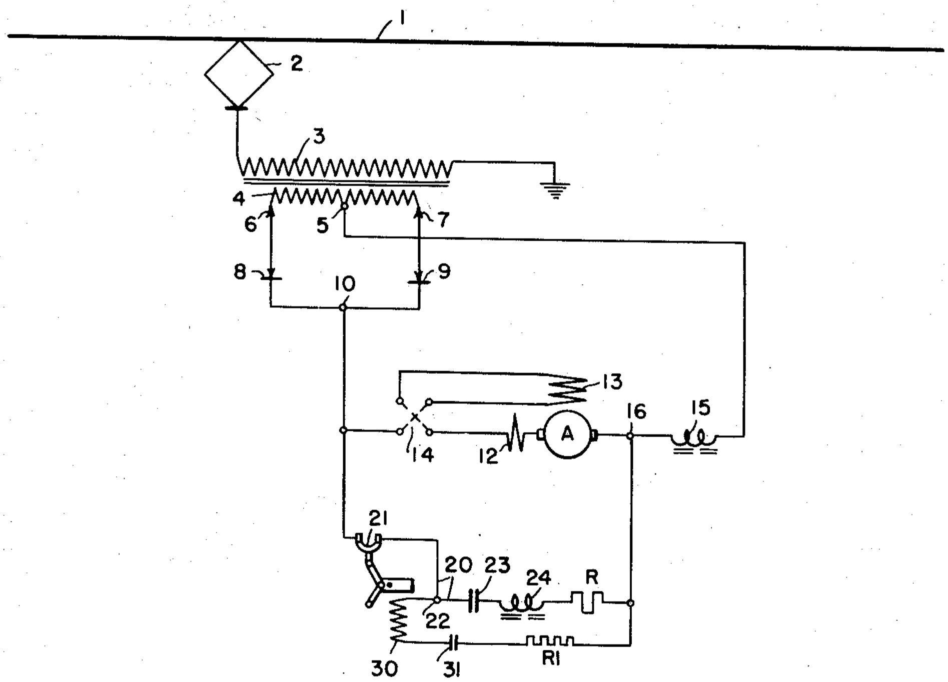
WITNESSES:
E. A. McCloskey.
N. W. C. Groome
INVENTOR
Lloyd J. Hibbard,
BY O. B. Buchanan
ATTORNEY Patented Sept. 22, 1953 2,653,286

UNITED STATES PATENT OFFICE 2,653,286

PULSATING-CURRENT MOTOR

Lloyd J. Hibbard, Pittsburgh, Pa., assignor to Westinghouse Electric Corporation, East Pittsburgh, Pa., a corporation of Pennsylvania Application May 5, 1951, Serial No. 224,748

10 Claims. (Cl. 318—246)

My invention relates to a ripple-reducing shunt or filter, and its control, for use in connection with a pulsating-current direct-current motor, such as a rectifier-powered traction-motor for a self-propelled vehicle.

My invention is an improvement over the apparatus described and claimed in my copending application Serial No. 120,331, filed October 8, 1949, for Inductive-Interference Preventive-Means, wherein was shown a railway-vehicle using rectifier-powered direct-current traction-motors, deriving their power from an alternating-current trolley which was subject to inductive interference with a neighboring communication-system.

As stated in the aforesaid copending application, it is extremely desirable to use a rectifier-powered direct-current circuit having sufficiently little inductance to permit the flow of a ripple of the order of 30 or 35%, more or less, defining the ripple-percentage as an expression of the fraction obtained by dividing the peak-value of the ripple by the average value of the direct-current, or the value of the direct-current component. By using such a relatively large ripple, it was possible to assist materially in reducing the magnitude of the interference-provoking harmonics in the alternating-current supply-system. This large ripple consists essentially or predominantly of the second harmonic of the line-frequency, as the higher-order even harmonics are of diminishing magnitudes to begin with, and are more and more effectively blocked by the impedance of the direct-current load-circuit, as the harmonic-order increases. My aforesaid copending application stated that it would be desirable, at times, to permit this relatively heavy ripple to flow in the direct-current output-circuit of the rectifiers, while at the same time shunting out a substantial portion of this ripple from the motor, by means of a ripple-reducing shunt-connected filter which is tuned approximately to the second harmonic.

I have discovered that the ripple-reducing filter must not only be tuned, not exactly, but only approximately, to the second-harmonic resonance, but it must always be so adjusted that the total filter-impedance, at the second-harmonic frequency, is inductive, and never capacitive, under any motor-operating condition. I say, "any motor-operating condition," because the inductive impedance of the direct-current motor varies rather considerably with its load-current, being high when the motor-current is small, and much lower when the motor-current is at its maximum. The impedance of the inductance-part of the filter also varies somewhat, with the current traversing it, but not in the same way as the variation of the motor-inductance.

As long as the shunt-connected filter-impedance is inductive, I will have an inductive motor-impedance which is shunted by an inductive filter-impedance, and the second-harmonic ripple-component of the motor-current will divide, in these two paths, in inverse proportion to the impedances of the respective paths. If, however, a smaller amount of capacitance had been used in the filter, so that the capacitive impedance of the filter would be larger than the inductive impedance of the filter at the ripple-frequency, which is the second harmonic of the line-current, then I would have an inductive motor-impedance, shunted by a capacitive over-all filter-circuit impedance, with the result that circulating second-harmonic currents would be produced, which would mean that the addition of such a filter would increase, rather than decrease, the magnitude of the ripple-currents, thus doing harm rather than good.

An object of my present invention is, therefore, to provide a ripple-reducing filter which has an inductive over-all impedance at the predominant ripple-frequency, rather than a capacitive over-all impedance.

The required filter-capacitance is so large, in practical cases, that its frequency has to be provided in something like eight "cans" or units, which are connected together, in parallel with each other, to provide the necessary total capacitance. These capacitor-units or "cans" are subject to failure, in which case the failed unit becomes disconnected from the system, either by burning itself out, or by clearing itself during the medium of individual capacitor-unit fuses, if fuses are used. When one or more capacitor-units fail, the total capacitance of the filter-circuit will ultimately become so small that the resulting capacitive impedance (which is the reciprocal of capacitance) becomes larger than the inductive impedance of the filter, and the filter will then have to be disconnected, as being no longer useful, and as being harmful in producing torque-vibration and commutator-sparking in the motor.

It is an object of my present invention, therefore, to provide means for automatically removing the ripple-reducing filter when its effect becomes harmful, rather than good.

With the foregoing and other objects in view, my invention consists in the circuits, systems, apparatus, combinations, parts, and methods of design and operation, hereinafter described and claimed, and illustrated in the accompanying drawing, the single figure of which is a simplified diagrammatic view of circuits and apparatus illustrating an exemplary form of embodiment of my invention.

As shown in the drawing, a single-phase or alternating-current supply-line is used, in the form of a trolley-wire 1, which may have a frequency of 25 cycles, 60 cycles, or any other commercial value. My invention is applicable to a trolley-energized vehicle, which is diagrammatically represented by means of a pantograph 2, or other current-collecting device, for supplying current from the trolley-wire 1 to the vehicle, usually through the intermediary of a step-down transformer 3. The transformer is shown as being of a type having a secondary winding 4 having a mid-point connection 5 and having voltage-varying taps 6 and 7 on opposite sides of the midpoint connection 5. As described in my copending application, the variable-voltage taps 6 and 7 are connected to the anodes of two rectifiers 8 and 9, which have a common cathode-circuit 10, which constitutes the positive supply-terminal of a pulsating-current motor-circuit.

The motor-circuit serially includes a series direct-current traction-motor, comprising an armature-winding A, interpole field-windings 12, and a series main-field winding 13, the latter being serially connected in the motor-circuit through a reverser 14. The motor-circuit also serially includes a choke-coil means 15, which is separate from the motor. The main motor-circuit, as illustrated, may be traced from the positive supply-terminal 10, through the reverser 14, the interpole windings 12, the armature A, the negative motor-terminal 16, the choke-coil 15, and the negative supply-terminal, which is the midpoint 5 of the transformer secondary-winding 4.

In accordance with my invention, I use a ripple-reducing motor-shunting filter-circuit 20, which is connected across all of the motor-windings, that is, between the conductors 10 and 16. This filter-circuit 20 serially includes the normally closed circuit-breaker contacts 21, a conductor 22, a filter-capacitor 23, a filter-inductance or choke-coil 24, and usually also a filter-resistance R. The inductive impedance of the filter-inductor 24 is slightly larger than the capacitive impedance of the filter-capacitor 23 at the predominant ripple-frequency of the motor-circuit, that is, at the second harmonic of the line-frequency supply-current. This insures that the filter always has an over-all or total inductive impedance, as distinguished from a capacitive impedance, thereby producing the desired ripple-reducing shunting-effect with respect to the currents flowing through the motor-windings A, 12, 13, as previously described.

In operation, the main motor-circuit choke-coil 15, which is not shunted by the ripple-reducing filter 20, is designed so as to have such an inductance as to limit the total ripple-content of the direct-current output-circuit 10 to 5 of the rectifier-system, to a predetermined value of the order of 30 or 35% or less, under maximum load-current conditions, this ripple-percentage being in any event considerably higher than the 15% which was the previously accepted ordinary maximum ripple-content which was used in most rectifier-circuits prior to my invention of the rectifier-powered locomotive as described and claimed in my previously mentioned copending application. While the direct-current motor A is frequently capable of operating in a satisfactory manner, with a ripple as high as 30 or 35%, it is usually preferable to obtain a somewhat better motor-performance by reducing this ripple to a value which is of the order of 10 or 15%, more or less, and it is the purpose of my ripple-reducing filter 20 to produce such a reduction in the ripple-content of the motor-current.

As previously indicated, the filter-capacitor 23 is subject to progressive failure, or progressive shrinkage in its total capacitance, so that it is likely to be subject to occasional increases in its capacitive impedance to the second-harmonic or ripple-frequency current, from time to time during the use of the apparatus. As long as this capacitance-shrinkage brings the filter resonance-frequency closer to the predominant ripple-frequency, which is the second harmonic of the line-current, this capacitance-shrinkage makes the filter better, rather than worse, because it makes the filter by-pass more of the ripple from the motor-circuit A, 12, 13. As soon, however, as the capacitance-shrinkage makes the capacitor-impedance larger than the inductor-impedance, in the filter-circuit 20, the over-all or total impedance of the filter then becomes capacitive, rather than inductive, and the filter then begins to circulate the second-harmonic currents in a circuit which includes the motor-windings A, 12 and 13, thus making the filter increase the motor-ripple, rather than decreasing the same.

It is desirable, therefore, to provide some means for automatically responding to a condition in which the capacitive impedance becomes larger than the inductive impedance of the filter 20 at the predominant ripple-frequency, which is the second harmonic of the line-frequency. Any means may be used, which will accomplish this purpose.

In general, the automatically responsive means will be something which will respond to a predetermined increase in the current which traverses the various impedances of the filter-circuit. By way of example, I have shown an over-voltage responsive-means, which responds to a predetermined magnitude of the alternating-current voltage-drop in at least a portion of the filter-circuit 20. To be exact, I have shown an overvoltage means which is responsive to a predetermined magnitude of the alternating-current component of the total voltage which is obtained across the whole of the filter-circuit 20, that is, across the impedances 23, 24 and R. Thus, I have shown a voltage-coil 30, which is connected between the conductors 22 and 16, through a blocking-capacitor 31 and a suitable current-limiting resistance R1. The blocking capacitor 31 blocks out the direct-current component of the voltage, so that the voltage-coil 30 responds only to the alternating-current component of the voltage. This voltage-coil 30 is used as the trip-coil of the circuit breaker which has its contact 21 in series with the filter-circuit 20. Consequently, when a circulating-current is produced, as a result of a shrinkage of the capacitance of the filter-capacitor 234, the voltage-coil 30 will be energized by the predominant ripple-component, with a force which is sufficient to trip the circuit-breaker and open the contact 21, thereby removing the filter 20 from the circuit, until it can be repaired.

While I have shown and described my invention in connection with only one illustrative form of embodiment, it will be obvious that many changes may be made, by way of the substitution of equivalents, or the omission or addition of parts, without departing from the essential spirit of my invention. I desire, therefore, that the accompanying claims shall be accorded the broadest construction consistent with their language.

I claim as my invention:

1. In combination, a direct-current motor-means, a motor-circuit for said motor-means, pulsating-current supply-terminals for said motor-circuit for supplying said motor-circuit with a direct current having a substantial ripple consisting predominantly of a predetermined alternating current frequency, and a ripple-reducing motor-shunting filter connected in shunt-circuit relation to at least some portion of the motor-means, said filter comprising a serially connected capacitor and inductor, the inductive impedance being slightly larger than the capacitive impedance of said filter at said predominant ripple-frequency.

2. The invention as defined in claim 1, in combination with means for removing said filter in response to a condition in which the capacitive impedance becomes larger than the inductive impedance of said filter at said predominant ripple-frequency.

3. The invention as defined in claim 1, in combination with means for removing said filter in response to a predetermined overcurrent-condition in said filter.

4. The invention as defined in claim 1, in combination with means for removing said filter in response to a predetermined magnitude of the alternating-current voltage-drop in at least a portion of said filter.

5. The invention as defined in claim 1, in combination with means for removing said filter in response to a predetermined magnitude of the alternating-current component of the voltage across the whole of said filter.

6. In combination, a series direct-current motor comprising an armature-winding and serially connected field-windings, a choke-coil means separate from said motor, a motor-circuit serially including said motor and said choke-coil means, pulsating-current supply-terminals for said motor-circuit for supplying said motor-circuit with a direct current having a substantial ripple consisting predominantly of a predetermined alternating-current frequency, and a ripple-reducing motor-shunting filter connected in shunt-circuit relation to all of the windings of said motor, said filter comprising a serially connected capacitor and inductor, the inductive impedance being slightly larger than the capacitive impedance of said filter at said predominant ripple-frequency.

7. The invention as defined in claim 6, in combination with means for removing said filter in response to a condition in which the capacitive impedance becomes larger than the inductive impedance of said filter at said predominant ripple-frequency.

8. The invention as defined in claim 6, in combination with means for removing said filter in response to a predetermined overcurrent-condition in said filter.

9. The invention as defined in claim 6, in combination with means for removing said filter in response to a predetermined magnitude of the alternating-current voltage-drop in at least a portion of said filter.

10. The invention as defined in claim 6, in combination with means for removing said filter in response to a predetermined magnitude of the alternating-current component of the voltage across the whole of said filter.

LLOYD J. HIBBARD.

References Cited in the file of this patent

UNITED STATES PATENTS

| Number | Name | Date |
|---|---|---|
| 1,956,550 | Dawson | May 1, 1934 |
| 2,554,248 | Hibbard | May 22, 1951 |